(12) United States Patent
Yasuhara et al.

(10) Patent No.: US 8,007,031 B2
(45) Date of Patent: Aug. 30, 2011

(54) REAR STRUCTURE OF VEHICLE BODY

(75) Inventors: Shigeto Yasuhara, Shioya-gun (JP); Yasuhisa Egawa, Sakura (JP); Yuji Matsuura, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 12/448,965

(22) PCT Filed: Jan. 21, 2008

(86) PCT No.: PCT/JP2008/050732
§ 371 (c)(1),
(2), (4) Date: Jul. 16, 2009

(87) PCT Pub. No.: WO2008/126432
PCT Pub. Date: Oct. 23, 2008

(65) Prior Publication Data
US 2010/0060040 A1 Mar. 11, 2010

(30) Foreign Application Priority Data

Mar. 30, 2007 (JP) ................................ 2007-093922
May 8, 2007 (JP) ................................ 2007-123384

(51) Int. Cl.
*B62D 43/10* (2006.01)
*B62D 25/20* (2006.01)

(52) U.S. Cl. .............. 296/187.11; 296/37.2; 296/203.04

(58) Field of Classification Search ............. 296/187.11, 296/37.2, 37.14, 203.04
See application file for complete search history.

(56) References Cited

U.S. PATENT DOCUMENTS

| 3,595,335 | A | * | 7/1971 | Wessells et al. | ......... 296/187.09 |
| 5,419,609 | A | | 5/1995 | Kmiec et al. | |
| 5,860,687 | A | * | 1/1999 | Corporon et al. | ............ 296/37.2 |
| 6,739,641 | B2 | * | 5/2004 | McLeod et al. | ............. 296/37.2 |
| 7,011,352 | B2 | * | 3/2006 | Matsuoka et al. | ......... 296/37.14 |
| 7,036,860 | B1 | * | 5/2006 | McGuckin et al. | ........... 296/37.2 |
| 7,429,076 | B2 | * | 9/2008 | Asahi et al. | ............. 296/203.04 |
| 7,540,559 | B2 | * | 6/2009 | Egawa et al. | ............ 296/203.04 |
| 2002/0180243 | A1 | * | 12/2002 | Kosuge | ..................... 296/203.04 |
| 2009/0195030 | A1 | * | 8/2009 | Yamaguchi et al. | ..... 296/193.08 |
| 2010/0225135 | A1 | * | 9/2010 | Taneda | ......................... 296/37.2 |

FOREIGN PATENT DOCUMENTS

| EP | 1 826 105 A1 | 8/2007 |
| JP | 08-080877 | 3/1996 |
| JP | 09-002336 A | 1/1997 |

* cited by examiner

Primary Examiner — Jason S Morrow
(74) Attorney, Agent, or Firm — Carrier Blackman & Associates, P.C.; Joseph P. Carrier; William D. Blackman

(57) ABSTRACT

A rear structure of a vehicle body, where a spare tire pan is supported by rear frames extending substantially in the longitudinal direction of a vehicle body, includes a plurality of arc-shaped beads that is continued in a circular arc shape and formed on the spare tire pan. The plurality of arc-shaped beads is disposed so as to be spaced apart from each other, and formed in a concave shape at substantially the same pitch toward the rear side of the vehicle body.

3 Claims, 14 Drawing Sheets

REAR STRUCTURE OF VEHICLE BODY

TECHNICAL FIELD

The present invention relates to a rear structure of a vehicle body of which energy-absorption performance during the rear-end collision of a vehicle is improved.

Priority is claimed on Japanese Patent Application No. 2007-093922, filed Mar. 30, 2007, and Japanese Patent Application No. 2007-123384, filed May 8, 2007, the contents of which are incorporated herein by reference.

BACKGROUND ART

A pair of rear frames which extends substantially in the longitudinal direction of a vehicle body is provided at the rear portion of a vehicle. The rear frames ensure the rigidity of the vehicle body, and absorb energy during the rear-end collision. The rear frames functions as structural member at a rear of the vehicle body, and collapse in a longitudinal direction during the rear-end collision, thereby efficiently absorbing collision energy.

Both edges of a spare tire pan on which a spare tire is detachably mounted are supported by the rear frames, respectively. The structure in which substantially circular beads are integrally formed with the spare tire pan and the rigidity of the spare tire pan is improved using the beads has been known as the above-mentioned rear structure of a vehicle body of a vehicle (see Japanese Unexamined Patent Application, First Publication No. H08-80877).

SUMMARY OF THE INVENTION

Problems to be Solved by the Invention

Since the spare tire pan includes the circular beads in the rear structure of a vehicle body in the related art, the rigidity of the spare tire pan is improved. However, energy absorption during the rear-end collision is not considered in this rear structure of a vehicle body. Accordingly, when load is input from the rear side during the rear-end collision, the spare tire pan is irregularly broken and cannot efficiently absorb collision energy. Since the collision energy is absorbed mainly by the collapse of the left and right rear frames, the cross sections of the rear frames should be increased in order to absorb large energy. Therefore, since the cross sections of the rear frames are increased in the rear structure of a vehicle body in the related art, the inner space of the trunk room or the vehicle cabin is decreased, so that it is difficult to ensure a large space in the trunk room or the vehicle cabin.

Means to Solve the Problem

An object of the invention is to provide a rear structure of a vehicle body that can improve energy-absorption performance during rear-end collision without increasing the cross sections of rear frames.

In order to achieve the above-mentioned object, the present invention is a rear structure of a vehicle body in which a spare tire pan is supported by a pair of rear frames extending substantially in a longitudinal direction of the vehicle body. The rear structure of a vehicle body includes a plurality of arc-shaped beads that is arrayed in a circular arc shape and formed on the spare tire pan. The plurality of arc-shaped beads is disposed so as to be spaced apart from each other at substantially a same pitch and formed in a convex shape toward a rear side of the vehicle body.

When collision load is input to the rear structure of the vehicle body from the rear side of the vehicle body due to the rear-end collision, the rear frames collapse in the longitudinal direction, and the plurality of the arc-shaped beads of the spare tire pan is crushed and deformed at a peak of each of the circular arcs thereof, that is, in a direction in which the collision load is input.

According to the present invention, the plurality of arc-shaped beads of the spare tire pan is reliably crushed and deformed during the rear-end collision at the portions thereof that extend in a direction crossing the direction in which collision load is input. Accordingly, it is possible to efficiently absorb the collision energy, without increasing the cross sections of the rear frames. As a result, it is possible to improve energy-absorption performance during the rear-end collision, without decreasing the inner space of the trunk room or the vehicle cabin.

The rear structure of a vehicle body may further include a cross member that supports the spare tire pan and is provided in front of the arc-shaped beads of the spare tire pan in the vehicle body.

In this case, since both ends of the plurality of arc-shaped beads are rigidly supported by the cross member, the plurality of arc-shaped beads can be efficiently crushed and deformed during the rear-end collision at the portions thereof that extend in a direction crossing the direction in which collision load is input.

The rear structure of a vehicle body may further include a transverse reinforcing bead that extends along a width direction of the vehicle body and is formed outside the spare tire pan in the width direction of the vehicle body.

In this case, since both ends of the plurality of arc-shaped beads are rigidly supported outside the spare tire pan in the width direction of the vehicle body by the transverse reinforcing bead, a deformation of both ends of each of the arc-shaped beads toward the outside in the width direction of the vehicle body is suppressed during the rear-end collision. Therefore, the plurality of arc-shaped beads can be efficiently crushed and deformed during the rear-end collision at the portions thereof that extend in the direction crossing the direction in which collision load is input.

The rear structure of a vehicle body may further include a longitudinal reinforcing bead that is provided on the spare tire pan. The longitudinal reinforcing bead may extend from a position where the cross member is provided in a substantially middle in the width direction of the vehicle body toward the rear side of the vehicle body.

In this case, since the front portion of the spare tire pan of the vehicle body is rigidly supported by the cross member through the longitudinal reinforcing bead in the substantially middle in the width direction of the vehicle body, the plurality of arc-shaped beads can be more efficiently crushed and deformed during the rear-end collision at the portions thereof that extend in a direction crossing the direction in which collision load is input.

The present invention is a rear structure of a vehicle body in which a spare tire pan is supported by a pair of rear frames extending substantially in a longitudinal direction of the vehicle body. The rear structure of a vehicle body includes a substantially conical part and convex arc-shaped beads. The substantially conical part is formed on the spare tire pan; and a central portion thereof protrudes upward so that an area near a position where a spare tire anchor nut is provided becomes a peak. The convex arc-shaped beads are formed on the substantially conical part so as to be arrayed in a circular arc shape around the vicinity of the position where the spare tire anchor nut is provided, and protrude toward a rear side of the vehicle body.

According to the rear structure of a vehicle body, when collision load is input from the rear side of the vehicle body due to the rear-end collision, the rear frames collapse in the longitudinal direction, and the arc-shaped beads of the spare tire pan are crushed at the portions thereof that extend in a direction crossing the direction in which collision load is input. In addition, finally, the substantially conical part of the spare tire pan is bent upward at the vicinity of the position where the spare tire anchor nut is provided.

Therefore, it is possible to efficiently absorb the collision energy, without increasing the cross sections of the rear frames. In addition, when the spare tire pan is finally bent and deformed, the substantially conical part is bent upward at the vicinity of the position where the spare tire anchor nut is provided. For this reason, the crush dust of the spare tire pan which is caused by the deformation of the spare tire pan is not accumulated in the deformable portion of the spare tire pan. As a result, it is possible to ensure large crushable margin of the spare tire pan, so that collision energy-absorption performance is improved. Therefore, it is possible to sufficiently improve energy-absorption performance at the rear portion of the vehicle body during the rear-end collision, without decreasing the inner space of the trunk room or the vehicle cabin.

The rear structure of a vehicle body may further include a cross member and a linear bead. The cross member supports the spare tire pan and is provided in front of the arc-shaped beads of the spare tire pan in the vehicle body. The linear bead is formed on the spare tire pan, connects ends of the arc-shaped beads with the vicinity of the cross member, and extends substantially in the longitudinal direction of the vehicle body.

In this case, since the ends of the arc-shaped beads are rigidly supported by the cross member through the linear bead, the arc-shaped beads can be efficiently crushed and deformed during the rear-end collision at the portions thereof that extend in a direction crossing the direction in which collision load is input.

Effects of the Invention

In the rear structure of the vehicle body according to the present invention, the plurality of arc-shaped beads of the spare tire pan is reliably crushed and deformed during the rear-end collision at the portions thereof that extend in a direction crossing the direction in which collision load is input. Accordingly, it is possible to efficiently absorb the collision energy, without increasing the cross sections of the rear frames. As a result, it is possible to improve energy-absorption performance during the rear-end collision, without decreasing the inner space of the trunk room or the vehicle cabin.

Figure 1:
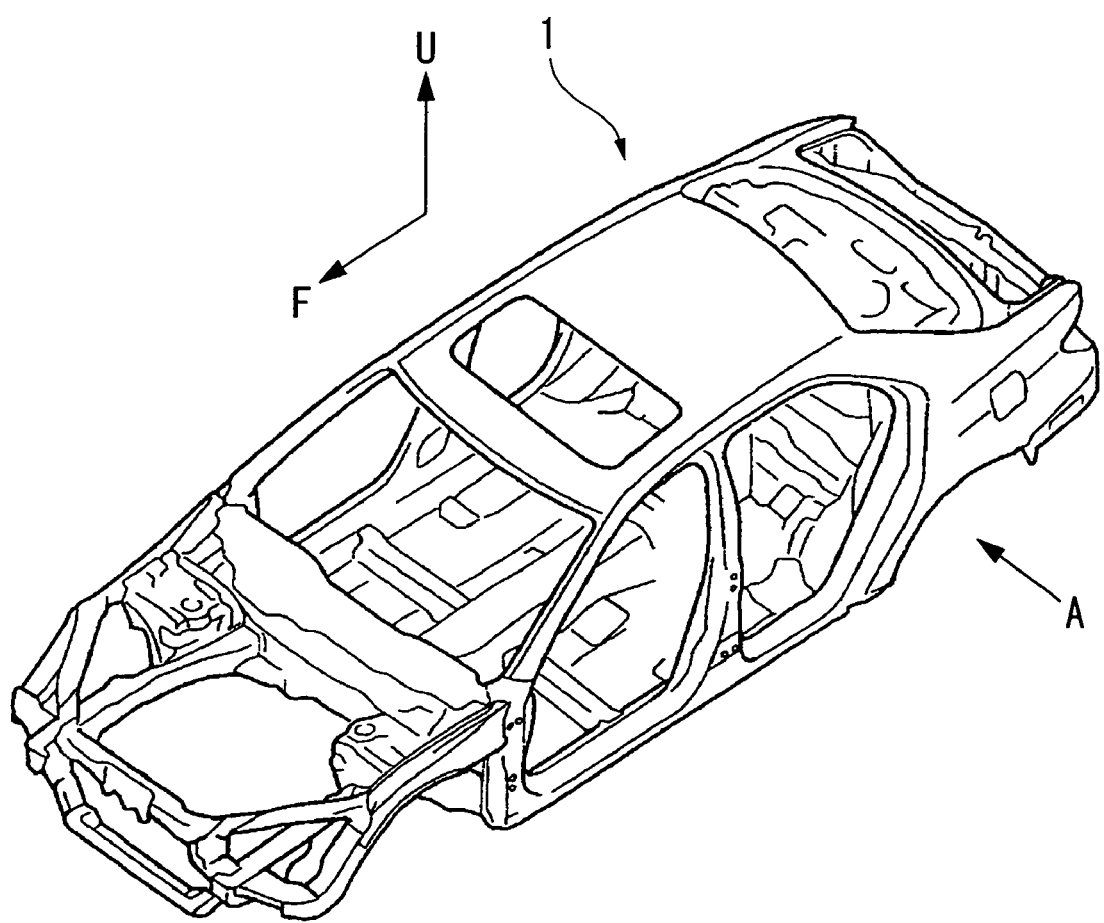
FIG. 1 is a perspective view showing a vehicle body according to a first embodiment of the present invention, as seen obliquely from an upper front side.

BRIEF DESCRIPTION OF THE REFERENCE SYMBOLS 2, 202: rear frame
4: middle cross member
5, 105, 208: spare tire pan
10a to 10e, 212a to 212e: arc-shaped bead
11a, 11b: transverse reinforcing bead
15a, 15b: longitudinal reinforcing bead
205: rear-cross member (cross member)
206: rear panel
210: spare tire anchor nut
211: substantially conical portion
213a to 213e: linear bead

PREFERRED EMBODIMENT OF THE INVENTION

Preferred embodiments of the present invention will be described below with reference to accompanying drawings.

First, a first embodiment shown in FIGS. 1 to 6B will be described. If not particularly mentioned in the following description, "front", "rear", "upper", and "lower" indicate the front, the rear, the upper, and the lower of a vehicle, respectively. Further, in drawings, an arrow F indicates the front of a vehicle, and an arrow U indicates the upper of a vehicle.

Figure 2:
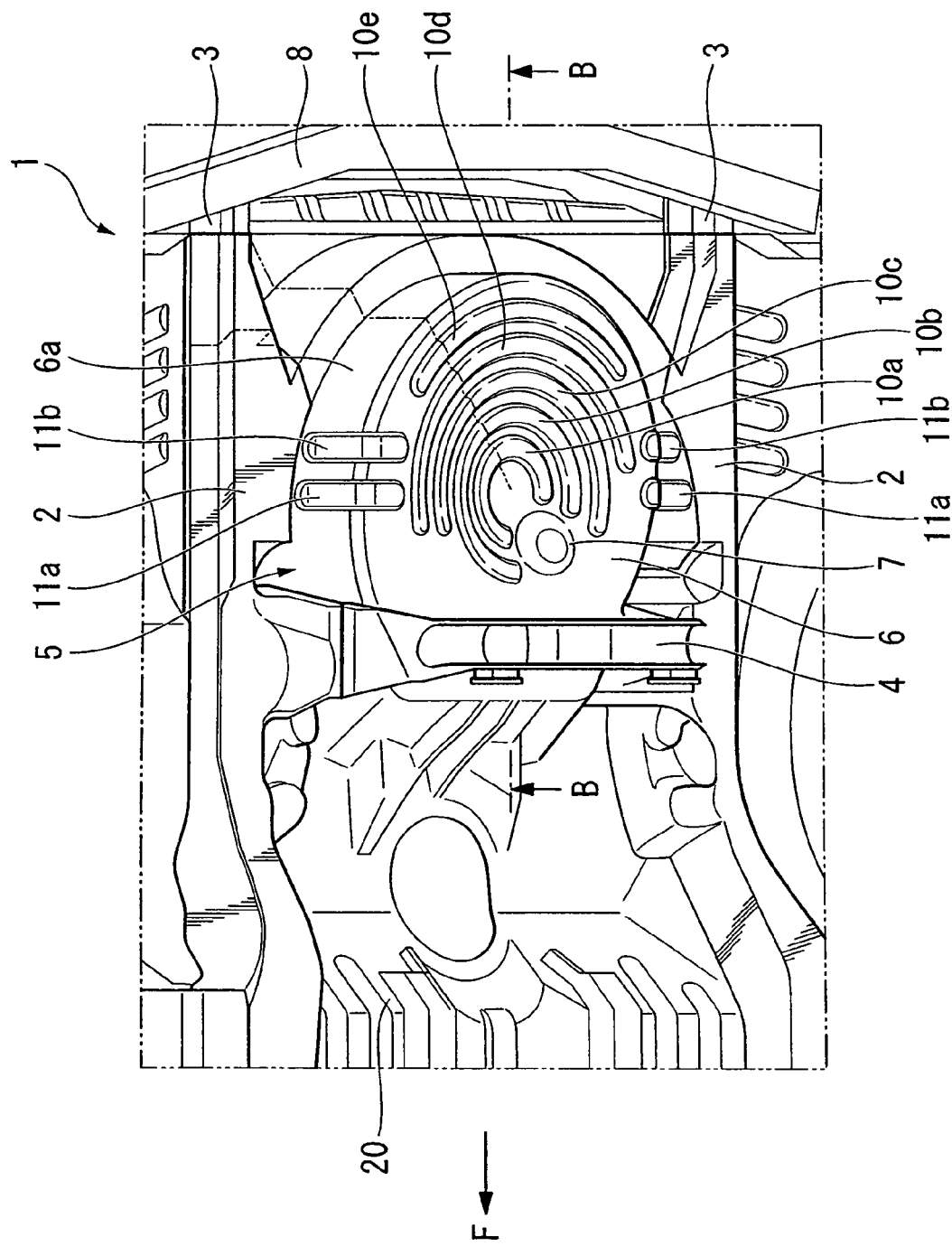
FIG. 2 is a view seen in a direction indicated by the arrow A of FIG. 1.

FIG. 1 is a perspective view of a vehicle 1, to which a rear structure of a vehicle body according to an embodiment of the present invention is applied, as seen obliquely from the upper front side. FIG. 2 is a view showing the vehicle 1, as seen in a direction indicated by an arrow A of FIG. 1 (as seen obliquely from the lower side of the vehicle body). As shown in FIG. 2, in the vehicle 1, a pair of (left and right) rear frames 2 is disposed on the rear lower side of the vehicle body substantially along a longitudinal direction of the vehicle body. A bumper beam 8 is supported at the rear ends of the rear frames 2 via bumper stays 3. Further, a middle cross member 4 is provided between the rear frames 2 at a middle position that is close to the front side. A spare tire pan 5 is attached to the upper surfaces of the rear frames 2 and the middle cross member 4, and supports a spare tire (not shown) on the lower side of a trunk room so that the spare tire can be attached or detached. A rear floor panel 20, which forms a rear floor in a vehicle cabin, is connected to a front edge of the spare tire pan 5.

A tire receiving surface 6 (see a cross section line shown by a two-dot chain line in FIG. 2), which is recessed downward substantially in a circular-shape, is formed substantially at the central portion of the spare tire pan 5. Further, a tire fixing boss 7 is formed at a position that is slightly and obliquely offset from the central position of the tire receiving surface 6 toward the front side. The spare tire provided on the tire receiving surface 6 is fixed to the boss 7 by a bolt and a nut (not shown).

A plurality of (specifically, five) arc-shaped beads 10a to 10e which protrudes upward is formed on the tire receiving surface 6 of the spare tire pan 5 at substantially the same pitch. The arc-shaped beads 10a to 10e are formed around the central portion of the tire receiving surface 6 so as to form circular arcs that have concentric shapes being convex toward the rear side of the vehicle body. Accordingly, a corrugated cross-section which is continuously formed by the plurality of arc-shaped beads 10a to 10e is formed along the longitudinal direction of the vehicle body substantially at the middle position of the tire receiving surface 6 in a width direction of the vehicle. Among the arc-shaped beads 10a to 10e, an inner arc-shaped bead in a radial direction has a larger circular arc angle (i.e., central angle of a circular arc), and the outermost arc-shaped bead 10e has the smallest circular arc angle. Both ends of each of two inner arc-shaped beads 10a and 10b in the radial direction face the spare tire fixing boss 7.

Two parallel transverse reinforcing beads 11a and 11b which linearly extend along the width direction of the vehicle are formed on each of the left and right sides of the outer peripheral portion of the tire receiving surface 6 of the spare tire pan 5 (including a peripheral wall 6a recessed in a concave shape) in the width direction of the vehicle. The transverse reinforcing beads 11a and 11b protrude upward from the tire receiving surface 6 like the arc-shaped beads 10a to 10e, and reinforce the outer regions of the tire receiving surface 6 formed outside the arc-shaped beads 10a to 10e in the width direction of the vehicle.

For the concise description, FIGS. 3A to 6B schematically show the only two (arc-shaped beads 10d and 10e) of the arc-shaped beads 10a to 10e formed on the spare tire pan 5. FIGS. 3A, 4A, 5A, and 6A are schematic cross-sectional views taken along the line B-B of FIG. 2. FIGS. 3B, 4B, 5B, and 6B are plan views of the spare tire pan 5 corresponding to cross sections of FIGS. 3A, 4A, 5A, and 6A. FIGS. 3A to 6B sequentially show that the spare tire pan 5 is deformed during the rear-end collision of the vehicle.

Figure 3A:
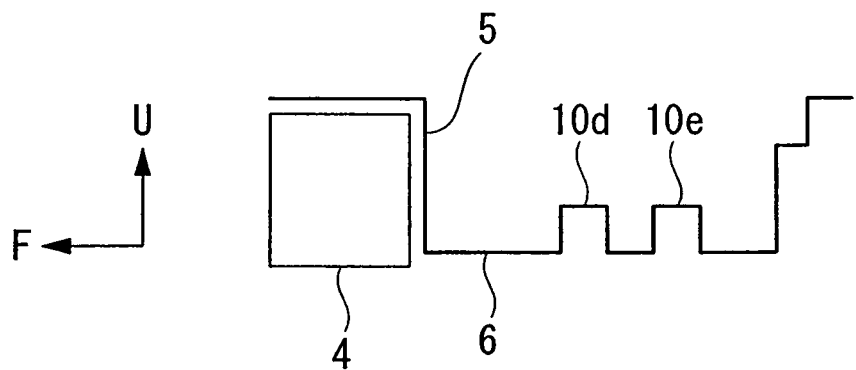
FIG. 3A is a schematic cross-sectional view taken along the line B-B of FIG. 2.
Figure 3B:
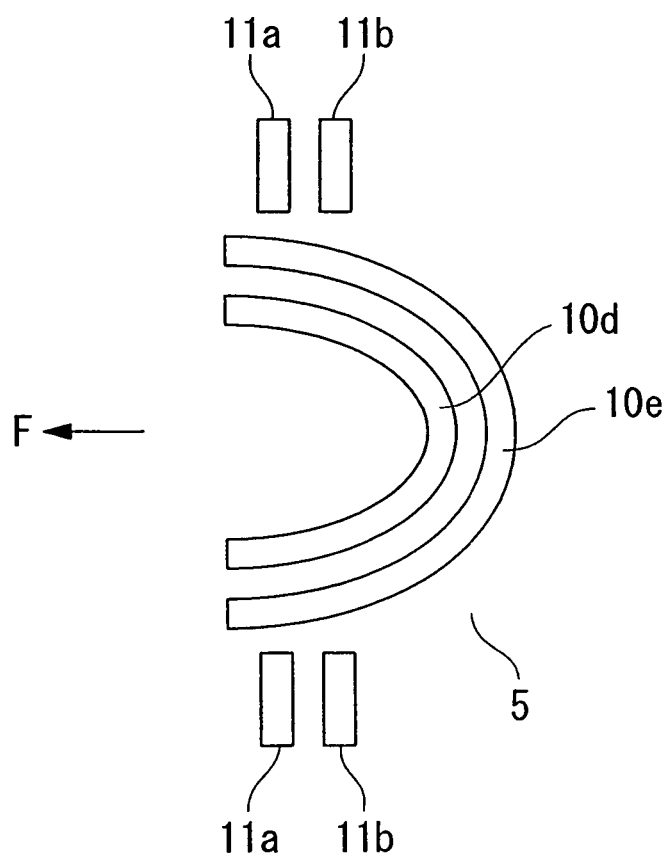
FIG. 3B is a schematic plan view showing a spare tire pan of the present embodiment.
Figure 4A:
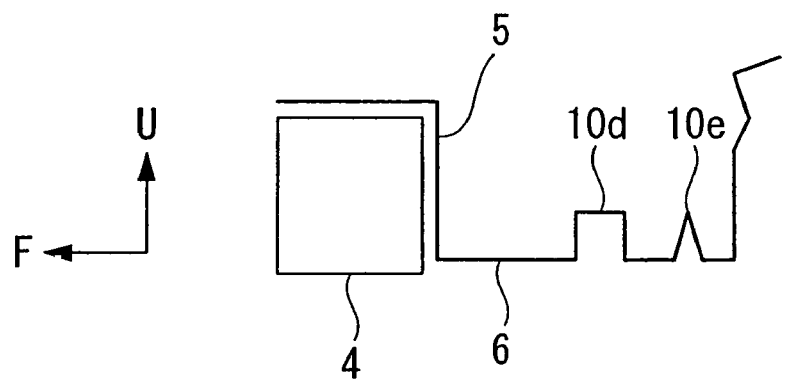
FIG. 4A is a schematic cross-sectional view taken along the line B-B of FIG. 2.
Figure 4B:
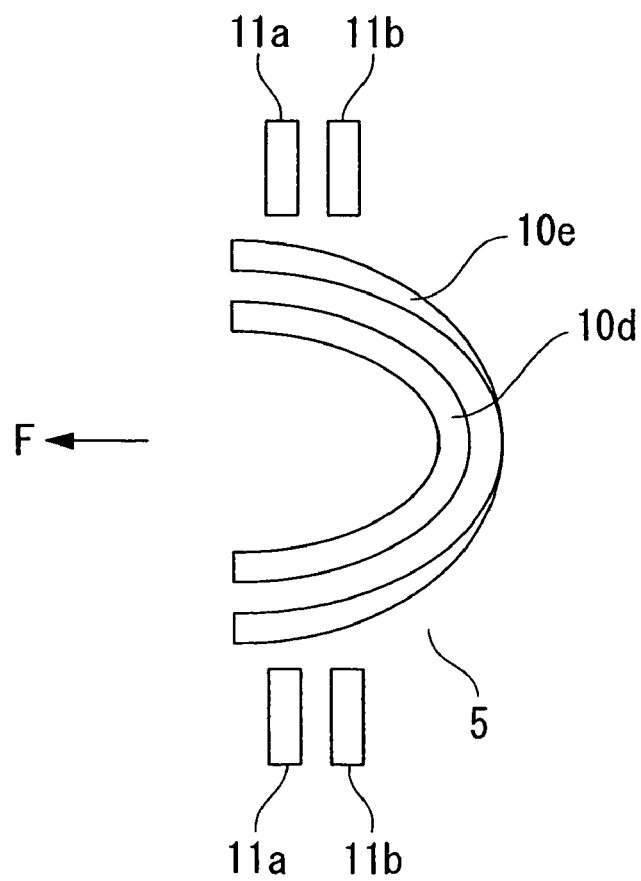
FIG. 4B is a schematic plan view showing the spare tire pan of the present embodiment.
Figure 5A:
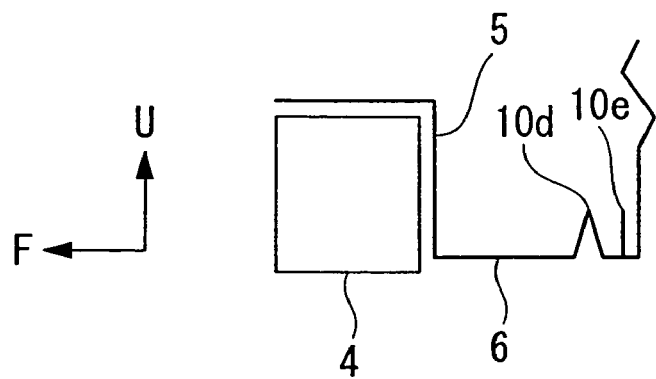
FIG. 5A is a schematic cross-sectional view taken along the line B-B of FIG. 2.
Figure 5B:
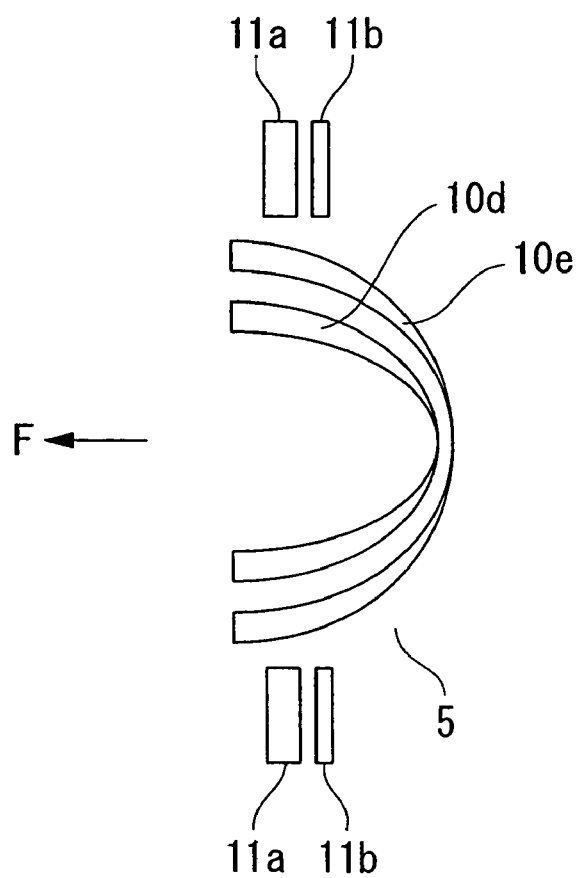
FIG. 5B is a schematic plan view showing the spare tire pan of the present embodiment.
Figure 6A:
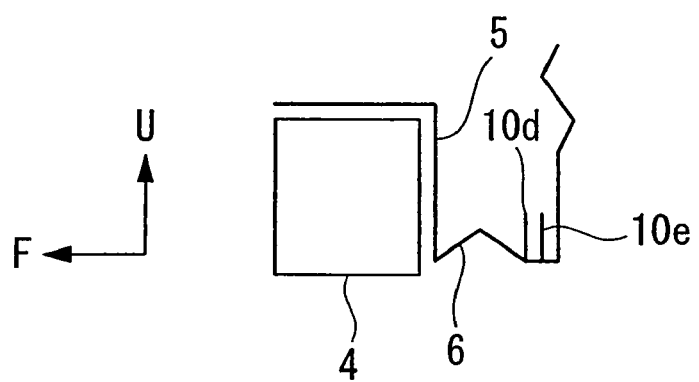
FIG. 6A is a schematic cross-sectional view taken along the line B-B of FIG. 2.
Figure 6B:
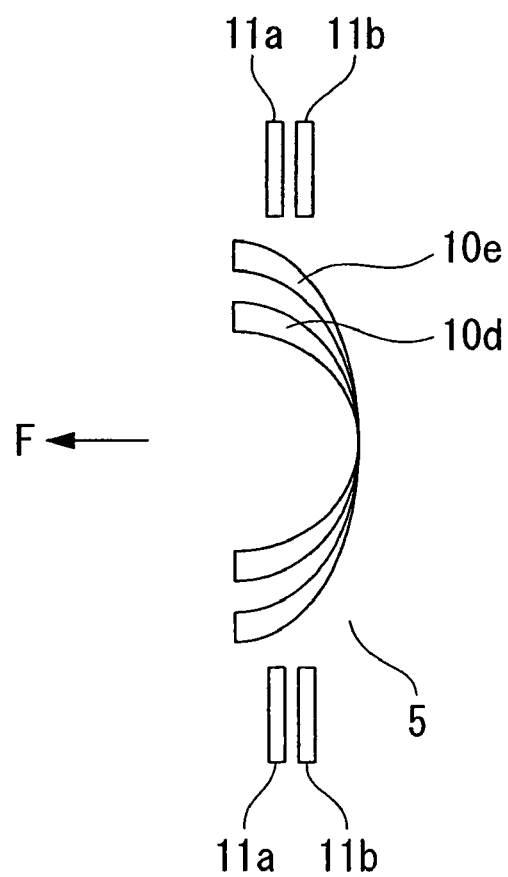
FIG. 6B is a schematic plan view showing the spare tire pan of the present embodiment.
Figure 7A:
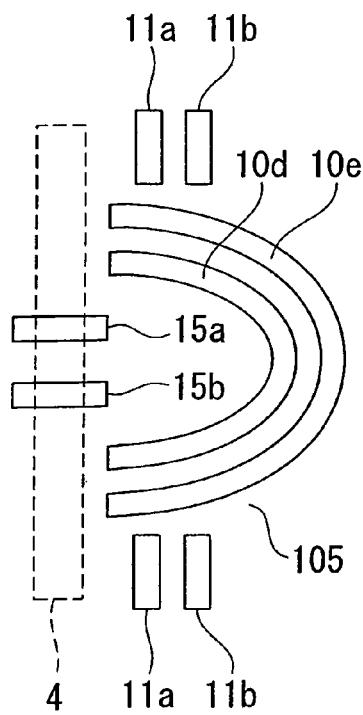
FIG. 7A is a schematic plan view showing a crushed and deformed condition of a spare tire pan according to a second embodiment of the present invention.
Figure 7B:
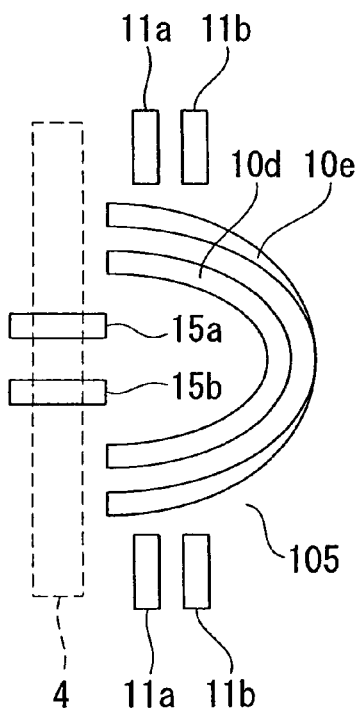
FIG. 7B is a schematic plan view showing a crushed and deformed condition of the spare tire pan according to the second embodiment of the present invention.
Figure 7C:
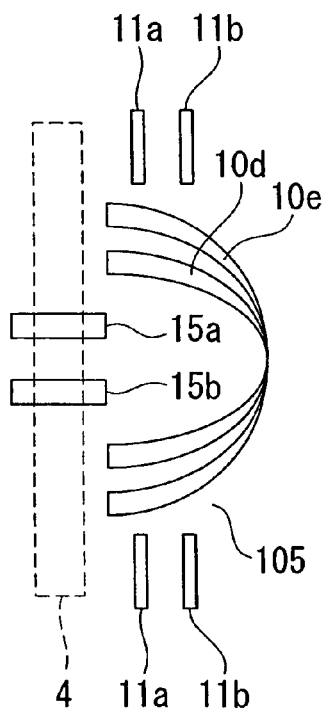
FIG. 7C is a schematic plan view showing a crushed and deformed condition of the spare tire pan according to the second embodiment of the present invention.
Figure 7D:
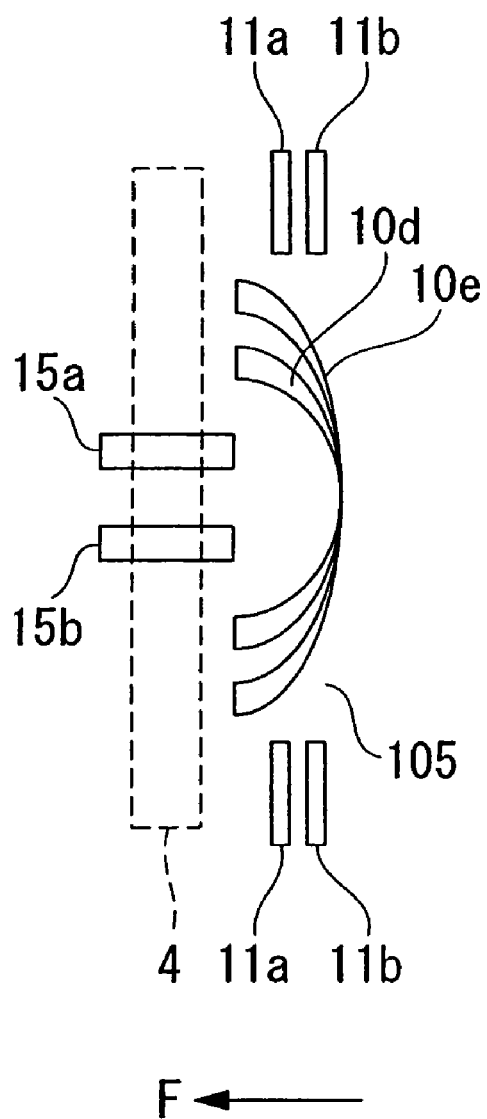
FIG. 7D is a schematic plan view showing a crushed and deformed condition of the spare tire pan according to the second embodiment of the present invention.
Figure 7E:
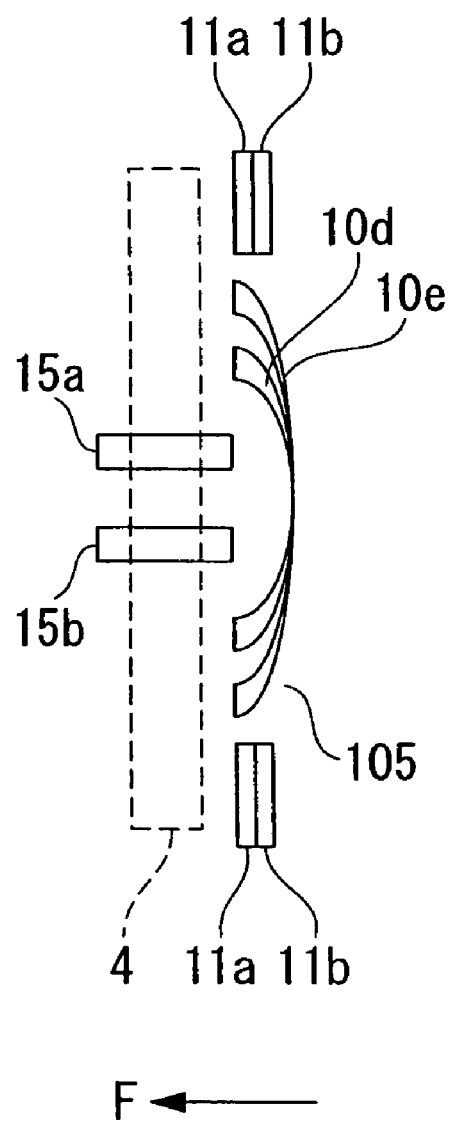
FIG. 7E is a schematic plan view showing a crushed and deformed condition of the spare tire pan according to the second embodiment of the present invention.

FIGS. 3A and 3B show the spare tire pan 5 before the beginning of the deformation thereof. When collision load is input to the bumper beam 8 (see FIG. 2), the rear frames 2 provided on both left and right sides of the vehicle body begin to collapse in a longitudinal direction. At the same time, as shown in FIGS. 4A and 4B, the arc-shaped bead 10e positioned at the rearmost position on the spare tire pan 5 begins to be crushed and deformed at the portion thereof that extends in a direction crossing a direction in which the collision load is input. In addition, as the load is input, as shown in FIGS. 5A, 5B, 6A, and 6B, the front arc-shaped bead 10d is also crushed and deformed at the portion thereof that extends in a direction crossing the direction in which the collision load is input. Although not shown in these drawings, if the load is further input, the front arc-shaped beads 10c, 10b, and 10a are also sequentially crushed and deformed at the portions thereof that extend in a direction crossing the direction in which the collision load is input.

The spare tire pan 5 is rigidly supported by the middle cross member 4 in front of the arc-shaped beads 10a to 10e. Accordingly, when the collision load is input to the spare tire pan 5 as described above, the collision load is not dispersed to the wide area on the spare tire pan 5 and concentrated on the portions of the arc-shaped beads 10a to 10e that extend in a direction crossing the direction in which the collision load is input. Therefore, the spare tire pan 5 is deformed in the form of a bellows near the portions of the arc-shaped beads 10a to 10e that extend in a direction crossing the direction in which the collision load is input. Further, all of the arc-shaped beads 10a to 10e gradually collapse, and efficiently absorb collision energy during the deformation thereof.

According to the first embodiment, the transverse reinforcing beads 11a and 11b are formed outside the spare tire pan 5 in the width direction of the vehicle. For this reason, when the collision load is input, it is possible to reliably support both ends of each of the arc-shaped beads 10a to 10e from the outside in the width direction of the vehicle. Therefore, due to the functions of the transverse reinforcing beads 11a and 11b, it is also possible to efficiently concentrate the collision load on in the vicinity of the portions of the arc-shaped beads 10a to 10e that extend in the direction crossing the direction in which the collision load is input.

For this reason, in the vehicle 1 that uses the rear structure of a vehicle body, the plurality of arc-shaped beads 10a to 10e of the spare tire pan 5 is deformed in the form of a bellows at the portions thereof that extend in the direction crossing the direction in which the collision load is input. Further, each of the arc-shaped beads 10a to 10e collapses at the portion thereof that extends in the direction crossing the direction in which the collision load is input. Accordingly, it is possible to efficiently absorb the collision energy. Therefore, it is possible to sufficiently absorb the rear-end collision load at the rear area of the vehicle body, without increasing the cross sections of the rear frames 2. As a result, it is possible to reduce the projection of the rear frames 2 that project into the trunk room or the vehicle cabin of the vehicle 1, and a large space is sufficiently ensured in the trunk room or the vehicle cabin.

Subsequently, a second embodiment shown in FIGS. 7A to 7E will be described. The same components as the components of the first embodiment shown in FIGS. 1 to 6B are indicated by the same reference symbols, and the overlapping description of the first embodiment will be partially omitted. FIGS. 7A to 7E are schematic plan view similar to FIGS. 3B to 6B of the first embodiment. For the simple description, the only two (arc-shaped beads 10d and 10e) of the arc-shaped beads formed on the spare tire pan 5 are shown in FIGS. 7A to 7E. It is preferable that a plurality of (for example, five) arc-shaped beads be actually provided like the first embodiment.

A rear structure of a vehicle body according to the present embodiment is basically the same as the rear structure according to the first embodiment. However, the present embodiment is different from the first embodiment in that a pair of longitudinal reinforcing beads 15a and 15b is added substantially at the middle portion of a spare tire pan 105 in a width direction of the vehicle. That is, a plurality of arc-shaped beads 10d and 10e that is arrayed in a circular arc shape is formed on a tire receiving surface (not shown), which is recessed in a concave shape, of the spare tire pan 105 in a convex shape at substantially the same pitch toward the rear side of the vehicle body. Further, a pair of transverse reinforcing beads 11a and 11b which extends along the width direction of the vehicle is formed outside the tire receiving surface of the spare tire pan 105 in the width direction of the vehicle. Furthermore, a pair of longitudinal reinforcing beads 15a and 15b is formed along the longitudinal direction of the vehicle body, from the portion supported by a middle cross member 4, which is provided substantially at the middle portion in the width direction of the vehicle, toward the rear side thereof. Like other beads 10d, 10e, 11a, and 11b, the longitudinal reinforcing beads 15a and 15b protrude upward from the tire receiving surface, and are linearly formed parallel to each other toward the rear side of the vehicle body.

In the vehicle that uses the present rear structure of a vehicle body, like the first embodiment, during the rear-end collision, the plurality of arc-shaped beads 10d and 10e is deformed in the form of a bellows at the portions thereof that extend in the direction crossing the direction in which the collision load is input, and all of the arc-shaped beads 10d and 10e collapse. Accordingly, it is possible to efficiently absorb the collision energy. In addition, the longitudinal reinforcing beads 15a and 15b which extend from the position of the portion supported by the middle cross member 4 toward the rear side of the vehicle body are provided substantially at the middle portion in the width direction of the vehicle. Accordingly, it is possible to efficiently concentrate the load during the rear-end collision, by using the portions of the arc-shaped beads 10d and 10e that extend in the direction crossing the direction in which the collision load is input. As a result, all of the arc-shaped beads 10d and 10e collapse during the rear-end collision as desired as sequentially shown in FIGS. 7A to 7E, so that it is possible to efficiently absorb large collision energy.

Next, a third embodiment of the present invention will be described with reference to drawings.

Figure 8:
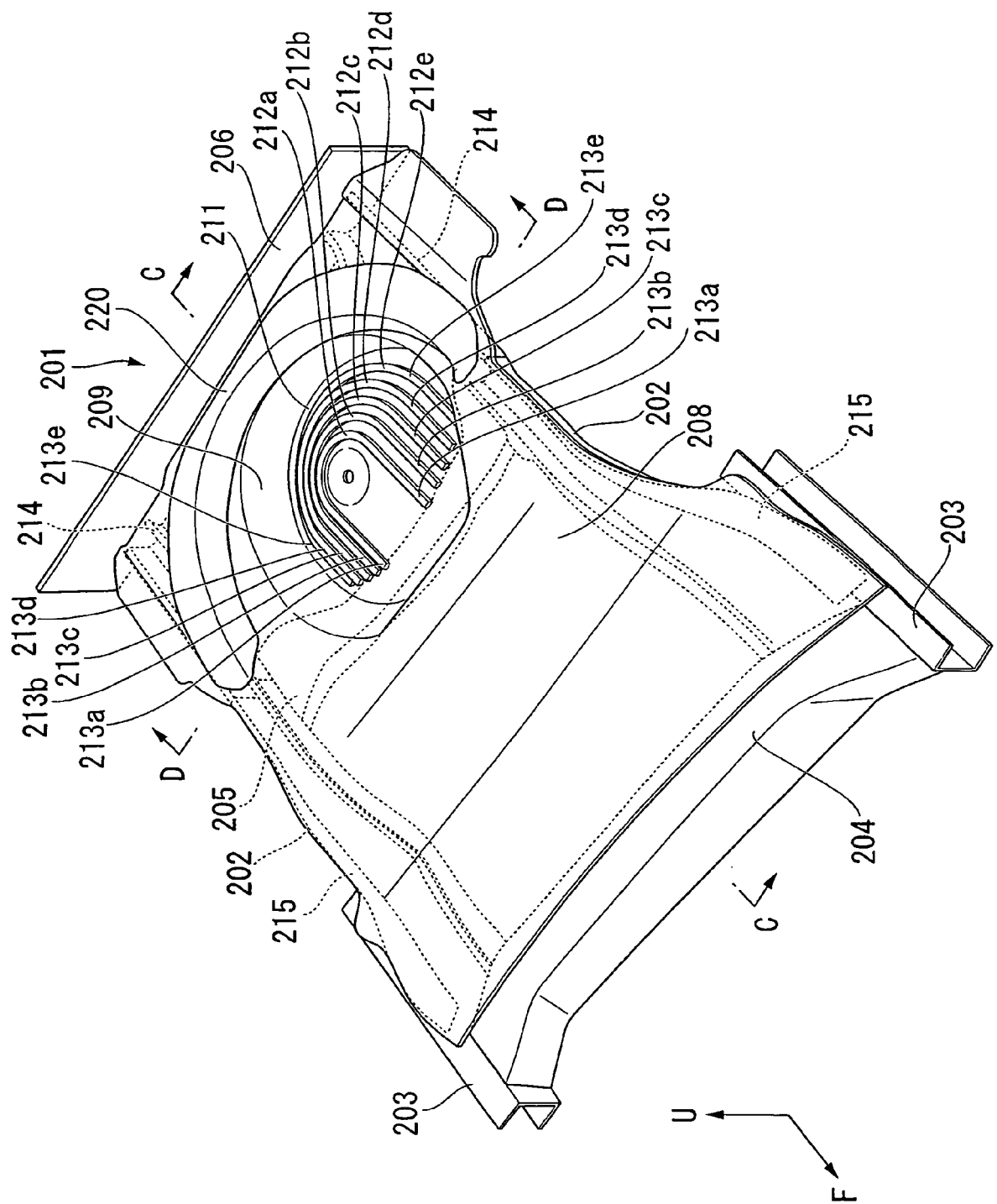
FIG. 8 is a perspective view shoeing a frame of the rear structure of the vehicle body according to a third embodiment of the present invention, as seen obliquely from an upper front side.
Figure 9:
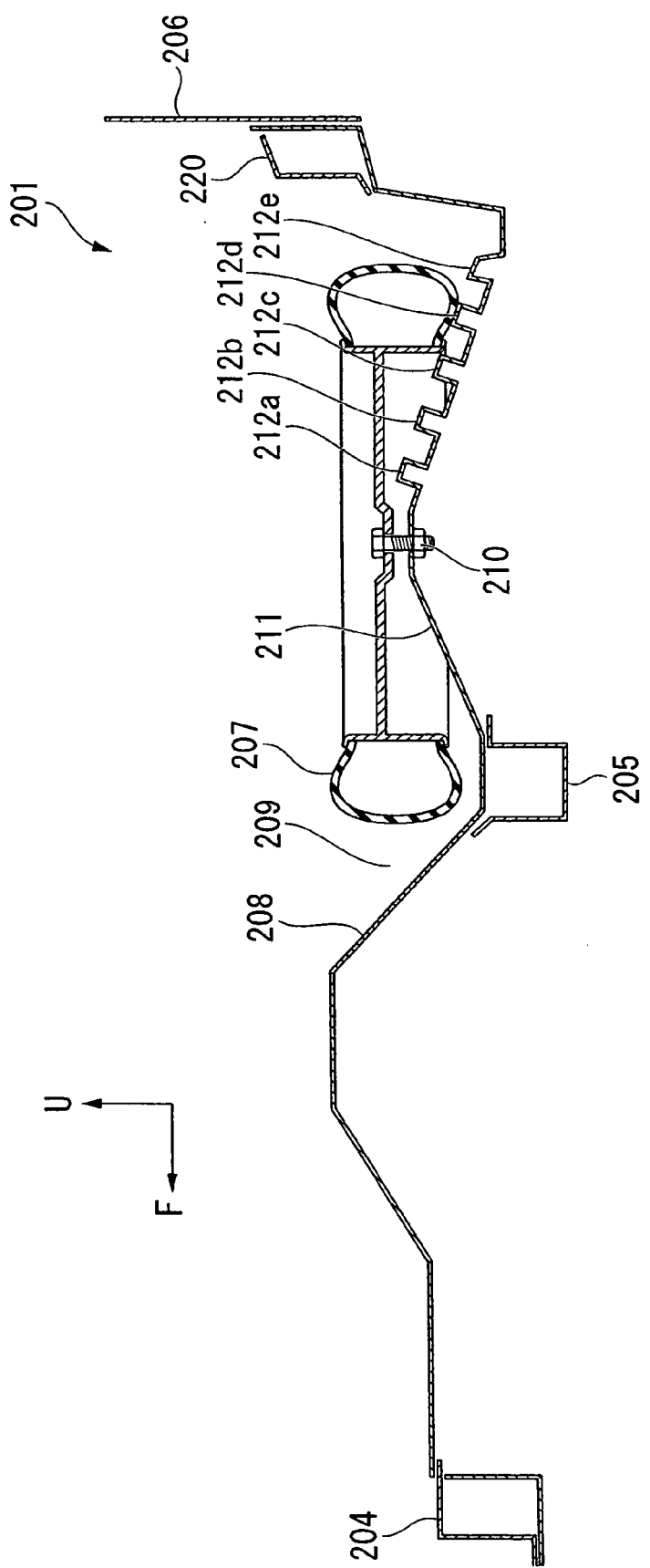
FIG. 9 is a cross-sectional view taken along the line C-C of FIG. 8.
Figure 10:
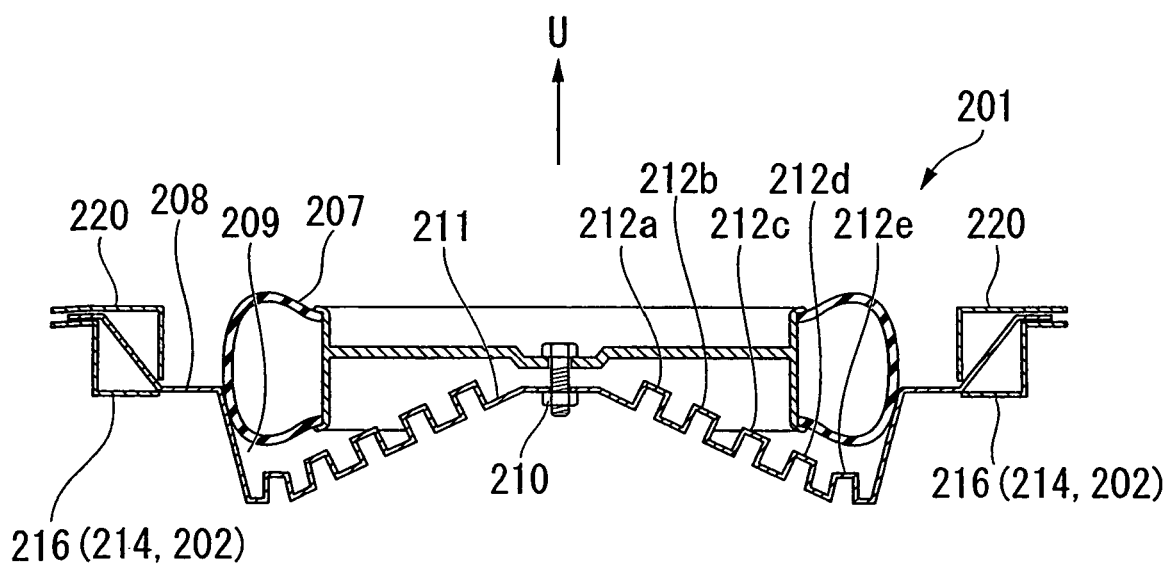
FIG. 10 is a cross-sectional view taken along the line D-D of FIG. 8.

FIG. 8 is a perspective view of a vehicle 201 to which a rear structure of a vehicle body according to the present invention is applied as seen obliquely from the upper front side. FIG. 9 is a cross-sectional view of the vehicle 201 taken along the line C-C of FIG. 8. FIG. 10 is a cross-sectional view of the vehicle 201 taken along the line D-D of FIG. 8.

In the vehicle 201, a pair of (left and right) rear frames 202 is disposed on the rear lower face of the vehicle body substantially along a longitudinal direction of the vehicle body. The front ends of the rear frames 202 are fixed to side sills 203 that are provided on left and right sides of the vehicle body and a middle cross member 204 that connects the rear ends of the side sills 203 with each other. A rear cross member 205 is provided between the middle portions of the rear frames 202; and a rear panel 206 forming a rear wall of the vehicle body is fixed to the rear ends of the rear frames 202. A bumper beam (not shown) of a rear bumper is disposed on the side of the rear panel 206 facing the outside of the vehicle. A spare tire pan 208 is attached to upper surfaces of the left and right rear frames 202 and the rear cross member 205 and supports a spare tire 207 (see FIGS. 9 and 10) on the lower side of a trunk room so that the spare tire can be attached or detached.

A tire receiving part 209 which is recessed downward substantially in a circular shape is formed substantially at the central portion of the spare tire pan 208. The spare tire 207 (see FIGS. 9 and 10) is received in the tire receiving part 209. A spare tire anchor nut 210 which is used to fix the spare tire 207 by using a bolt is provided near the central portion of a bottom wall of the tire receiving part 209. A substantially conical part 211 is formed on the bottom wall of the tire receiving part 209. The central portion of the substantially conical part protrudes upward so that an area near the position where the spare tire anchor nut 210 is provided becomes a peak.

A plurality of (specifically, five) arc-shaped beads 212a to 212e which protrudes upward is formed on the substantially conical part 211 of the spare tire pan 208 at substantially the same pitch. Each of the arc-shaped beads 212a to 212e continuously forms a circular shape having a center near the position where the spare tire anchor nut 210 is provided, and is formed in a convex shape toward the rear side of the vehicle body. Accordingly, as shown in FIG. 9, a corrugated cross-section which is continuously formed by the plurality of arc-shaped beads 212a to 212e is formed substantially along the longitudinal direction of the vehicle body at the area of the substantially conical part 211 that is close to the rear side of the vehicle.

Linear beads 213a to 213e which extend in the longitudinal direction of the vehicle body from both ends of each of the arc-shaped beads 212a to 212e to the vicinity of the rear cross member 205 are formed on the spare tire pan 208. Each of the linear beads 213a to 213e protrudes upward from the spare tire pan 208 like the arc-shaped beads 212a to 212e, and is formed so that the cross sections thereof are connected to the cross sections of corresponding arc-shaped beads 212a to 212e, respectively.

As shown in FIG. 8, each of the left and right rear frames 202 which supports the spare tire pan 208 includes a first frame 214 and a second frame 215. The rear end of the first frame 214 is attached to the rear panel 206. The front end of the second frame 215 is attached to the side sill 203; and the rear end of the second frame 215 is attached to the front end of the first frame 214. The basic cross section (cross section taken along the width direction of the vehicle) of each of the first frame 214 and the second frames 215 is a hat-shaped cross section open toward the upper side. That is, the basic cross section is formed in a shape where flanges are formed at both edges of a U-shaped cross section open toward the upper side. However, as shown in FIG. 10, a portion close to the front end of the first frame 214 is a modified cross-section part 216 which has an substantially L-shaped cross section where a side wall facing the tire receiving part 209 of the spare tire pan 208 is gradually inclined inward in the width direction of the vehicle.

The middle portion of the rear panel 206 in the width direction of the vehicle and the areas of the left and right rear frames 202 close to the front end of the first frame 214 are fixed to each other by an arc-shaped frame 220 that has a substantially circular arc-shape in plan view. As shown in FIGS. 9 and 10, the cross section of the arc-shaped frame 220 orthogonal to the longitudinal direction is formed substantially in an L shape. Further, a portion of the arc-shaped frame 220 corresponding to the substantially middle of the arc shape overlaps a rear edge of the spare tire pan 208 and the rear panel 206, and is attached thereto. Furthermore, both ends of the circular arc extend to the positions reaching the rear ends of the second frames 215 of the left and right rear frames 202, respectively. As shown in FIG. 9, a portion corresponding to the substantially middle of the circular arc of the arc-shaped frame 220 forms a closed cross section which has a boxy shape together with the rear end of the spare tire pan 208.

As described above, the spare tire pan 208 is attached to the upper surfaces of the left and right rear frames 202. As shown in FIG. 10, portions corresponding to the front edges of the first frames 214 of the rear frames 202, among the side edges of the spare tire pan 208, are inclined upward toward the side of the vehicle body so as to correspond to the shape of the upper surface of the modified cross-section part 216 (so as to block the upper side). While the side edges of the spare tire pan 208 is caught between the end edge of the arc-shaped frame 220 having substantially an L-shaped cross section and the modified cross-section part 216 of the first frame 214, the arc-shaped frame 220 and the first frame 214 are fixed to the side edges of the spare tire pan 208. Accordingly, the opposite corners of the boxy closed cross section that is formed by the arc-shaped frame 220 and the first frame 214 are reinforced with the side edges of the spare tire pan 208, so that the side edges of the spare tire pan 208 are rigidly supported by the arc-shaped frame 220 and the first frames 214.

Figure 11:
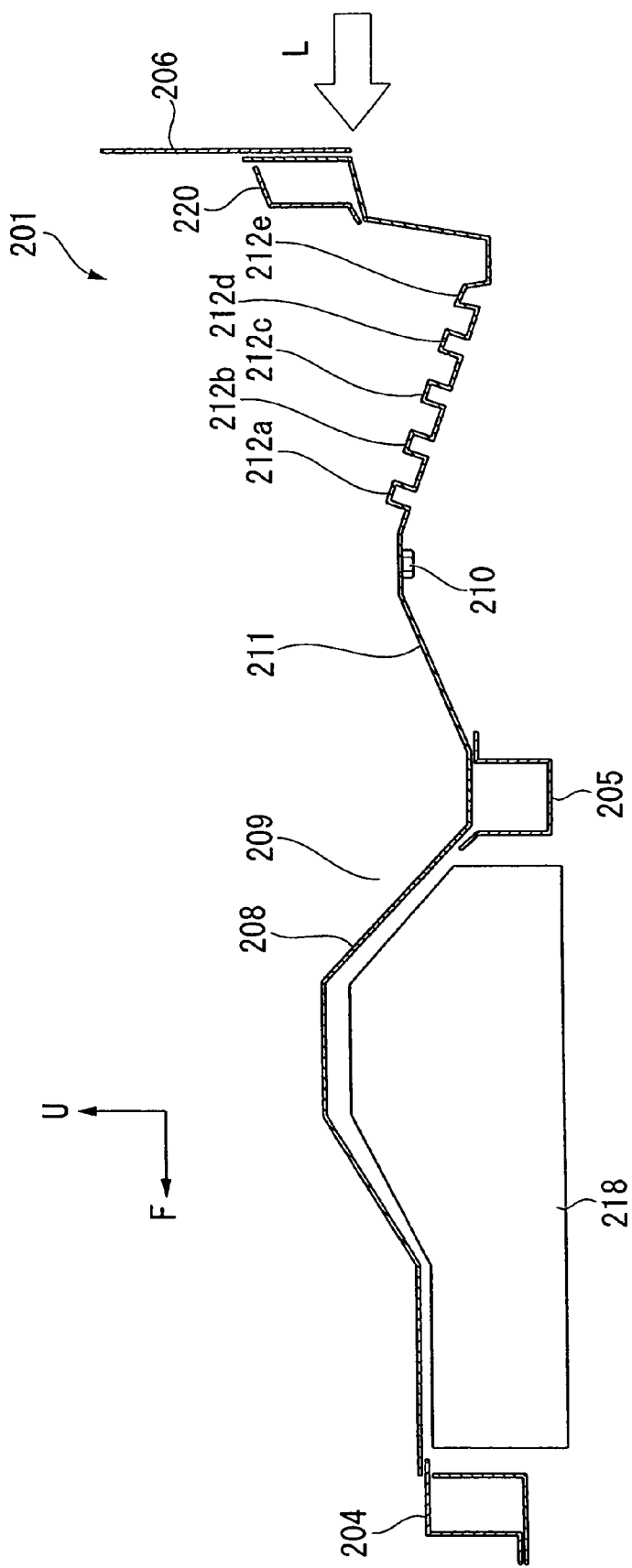
FIG. 11 is a cross-sectional view taken along the line C-C of FIG. 8 at the beginning of rear-end collision.
Figure 12:
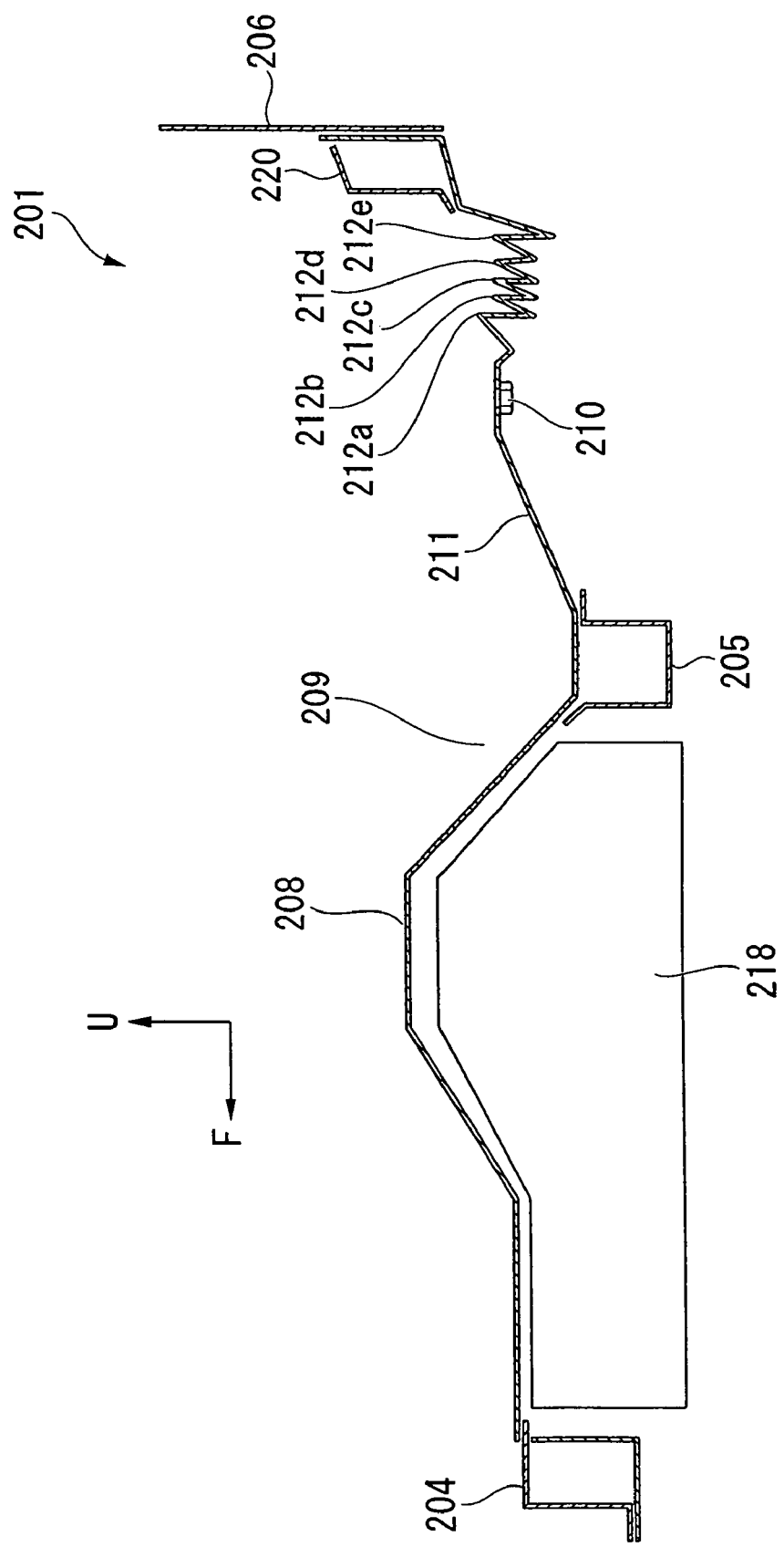
FIG. 12 is a cross-sectional view taken along the line C-C of FIG. 8 in the middle of the rear-end collision.
Figure 13:
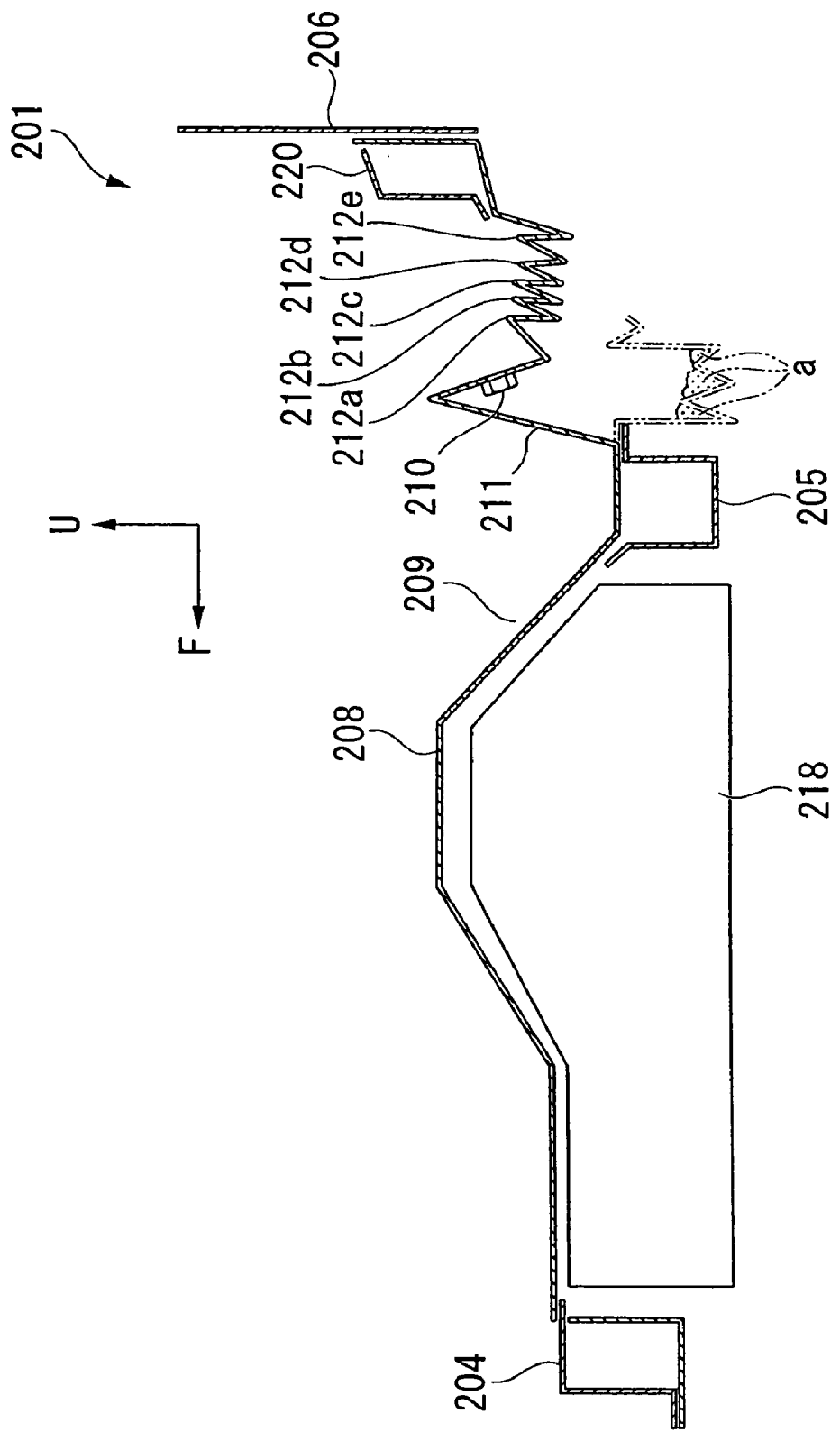
FIG. 13 is a cross-sectional view taken along the line C-C of FIG. 8 at the end of the rear-end collision.

FIGS. 11 to 13 sequentially show that the spare tire pan 208 is deformed during the rear-end collision of the vehicle. In FIGS. 11 to 13, a reference symbol 218 indicates a fuel tank that is disposed between the rear cross member 205 and the middle cross member 204 on the front and lower side of the spare tire pan 208.

FIG. 11 shows the spare tire pan 208 before the beginning of the deformation thereof. When the rear-end collision load L is input to the rear panel 206, the rear-end collision load L is directly input to the rear ends of the left and right rear frames 202 and transmitted to the side sills 203. Further, the rear-end collision load L is transmitted to the side sills 203 through load transmission paths that are formed from the substantially middle (rear side) of the arc-shaped frame 220 toward both ends thereof. Accordingly, the left and right rear frames 202 begin to collapse in the longitudinal direction. Further, as shown in FIG. 12, the arc-shaped beads 212*a* to 212*e* formed on the spare tire pan 208 are crushed and deformed at the portions thereof that extend in a direction crossing the direction in which the collision load is input.

Both ends of each of the arc-shaped beads 212*a* to 212*e* are rigidly supported by the rear cross member 205 through the linear beads 213*a* to 213*e*. Accordingly, the collision load L is not dispersed to the wide area on the spare tire pan 208 and concentrated on the portions of the arc-shaped beads 212*a* to 212*e* that extend in a direction crossing the direction in which the collision load is input. Therefore, the spare tire pan 208 is deformed in the form of a bellows near the portions of the arc-shaped beads 212*a* to 212*e* that extend in a direction crossing the direction in which the collision load is input. Further, all of the arc-shaped beads 212*a* to 212*e* gradually collapse, and efficiently absorb collision energy during the deformation thereof.

Therefore, it is possible to sufficiently absorb the rear-end collision load at the rear area of the vehicle body, without increasing the cross sections of the rear frames 202 in the vehicle 201 to which the rear structure of a vehicle body is applied. As a result, it is possible to reduce the projection of the rear frames 202 that project into the trunk room or the vehicle cabin.

If the rear-end collision load L is further input in the above-mentioned state, finally, the portion near the peak of the substantially conical part 211 is further pushed upward as shown in FIG. 13. Accordingly, while being bent and deformed, the spare tire pan 208 efficiently absorbs collision energy. Since the spare tire pan 208 is deformed to be further pushed upward in the vicinity of the peak of the substantially conical part 211, the crush dust "a" of the spare tire pan 208 is not accumulated in the deformable portion of the spare tire pan 208 and it is possible to ensure large crushable margin of the spare tire pan 208. That is, when the spare tire pan 208 is bent downward and deformed as shown by a chain line in FIG. 13, the crush dust "a" is accumulated between the deformed portions, so that the further deformation of the spare tire pan 208 is prevented. As a result, the deformation of the vehicle body caused by the collision load easily proceeds to the front side of the rear cross member 205. Meanwhile, since the spare tire pan 208 is reliably bent upward in the rear structure of a vehicle body according to the present embodiment, it is possible to suppress an obstruction of the deformation of the spare tire pan 208 caused by the crush dust "a".

The vehicle 201 of the present embodiment is provided with the arc-shaped frame 220 that connects the substantially middle portion of the rear panel 206 in the width direction of the vehicle with the substantially middle portions of the left and right rear frames 202 in the longitudinal direction. Therefore, even in the case of rear-end offset collision, it is possible to make the left and right rear frames 202 evenly support the load. Further, since the collision load is supported by the rear frames 202 without the significant bias of the collision load to the left or right side, the load input to the spare tire pan 208 acts reliably to the vicinity of the portions of the arc-shaped beads 212*a* to 212*e* that extend in a direction crossing a direction in which the collision load is input. Therefore, it is possible to reliably make the arc-shaped beads 212*a* to 212*e* collapse at the portions thereof that extend in a direction crossing the direction in which the collision load is input.

In addition, according to the present embodiment, both side edges of the spare tire pan 208 are attached to be caught between the end edges of the arc-shaped frame 220 and the left and right rear frames 202 (first frames 214) that are attached to each other and form a closed cross section. Accordingly, the collision load which is input to the rear frame 202 or the arc-shaped frame 220 can be reliably and stably applied to the vicinity of the portions of the arc-shaped beads 212*a* to 212*e* of the spare tire pan 208 that extend in a direction crossing a direction in which the collision load is input.

Meanwhile, the invention is not limited to the above-mentioned embodiments, and may have various modifications without departing from the scope and spirit of the invention.

INDUSTRIAL APPLICABILITY

In the rear structure of a vehicle body according to the present invention, the plurality of arc-shaped beads of the spare tire pan is reliably crushed and deformed during the rear-end collision at the portions thereof that extend in a direction crossing the direction in which collision load is input. Accordingly, it is possible to efficiently absorb the collision energy, without increasing the cross sections of the rear frames. As a result, it is possible to improve energy-absorption performance during the rear-end collision, without decreasing the inner space of the trunk room or the vehicle cabin.

What is claimed is:

1. A rear structure of a vehicle body in which a spare tire pan is supported by a pair of rear frames extending substantially in a longitudinal direction of the vehicle body, the rear structure of the vehicle body comprising:

more than two arc-shaped beads that are arrayed in a circular arc shape and formed on the spare tire pan, wherein the arc-shaped beads are disposed so as to be spaced apart from each other at substantially a same pitch and formed in a convex shape toward a rear side of the vehicle body;

a cross member that supports the spare tire pan and is provided in front of the arc-shaped beads of the spare tire pan in the vehicle body; and a longitudinal reinforcing bead that is provided on the spare tire pan, the longitudinal reinforcing bead extending from a position where the cross member is provided, in a substantially middle part in a width direction of the vehicle body, toward the rear side of the vehicle body.

2. The rear structure of a vehicle body according to claim 1, further comprising a transverse reinforcing bead that extends along a width direction of the vehicle body and is formed outside the spare tire pan in the width direction of the vehicle body.

3. A rear structure of a vehicle body in which a spare tire pan is supported by a pair of rear frames extending substantially in a longitudinal direction of the vehicle body, the rear structure of a vehicle body comprising:

a substantially conical part that is formed on the spare tire pan, a central portion of the substantially conical part protruding upward so that an area near a position where a spare tire anchor nut is provided becomes a peak; and a plurality of convex arc-shaped beads that are formed on the substantially conical part so as to be arrayed in a circular arc shape around the vicinity of the position where the spare tire anchor nut is provided, the convex arc-shaped beads protruding toward a rear side of the vehicle body;

a cross member that supports the spare tire pan and is provided in front of the arc-shaped beads of the spare tire pan in the vehicle body; and a linear bead that is formed on the spare tire pan, connects the ends of the arc-shaped beads with the vicinity of the cross member, and extends substantially in the longitudinal direction of the vehicle body.

* * * * *